United States Patent [19]

Imai

[11] Patent Number: 5,896,381

[45] Date of Patent: Apr. 20, 1999

[54] INSTANTANEOUS SWITCHING UNIT AND SWITCHING METHOD FOR DELAY/PRIORITY CONTROL BUFFER

[75] Inventor: Kunihiro Imai, Tokyo, Japan

[73] Assignee: NEC Corporation, Tokyo, Japan

[21] Appl. No.: 08/802,391

[22] Filed: Feb. 18, 1997

[30] Foreign Application Priority Data

Feb. 16, 1996 [JP] Japan .................................. 8-053854

[51] Int. Cl.⁶ ........................................... H04B 29/00
[52] U.S. Cl. ............................ 370/395; 370/219; 370/220
[58] Field of Search ................................ 370/395, 219, 370/220

[56] References Cited

U.S. PATENT DOCUMENTS

| | | | |
|---|---|---|---|
| 5,153,578 | 10/1992 | Izawa | 370/395 |
| 5,274,633 | 12/1993 | Kato | 370/395 |
| 5,414,696 | 5/1995 | Tsuzuki | 370/395 |
| 5,561,661 | 10/1996 | Edmaier | 370/395 |
| 5,732,069 | 3/1998 | Nagino | 370/395 |

FOREIGN PATENT DOCUMENTS 4-86043  3/1992  Japan .

*Primary Examiner*—Brian Zimmerman
*Attorney, Agent, or Firm*—Sughrue, Mion, Zinn, Macpeak & Seas, PLLC

[57] ABSTRACT

An instantaneous switching unit for a delay/priority control buffer comprises an operational buffer and a standby buffer, wherein, upon detecting phase adjustment cell out of received signal cell, the operational buffer recognizes the amount of main signal cell which has been received before the phase adjustment cell is detected, the main signal cell staying waiting for the timing when it is read out, and notifies the standby buffer of staying amount information indicating the presence of the main signal cell staying there as well as the staying amount thereof, while the standby buffer controls the reading operation of the main signal cell according to the staying amount information received from the operational buffer upon detecting the phase adjustment cell out of the received signal cell.

9 Claims, 4 Drawing Sheets

INSTANTANEOUS SWITCHING UNIT AND SWITCHING METHOD FOR DELAY/PRIORITY CONTROL BUFFER

BACKGROUNDS OF THE INVENTION

1. Field of the Invention

The present invention relates to an instantaneous switching unit and switching method for a delay/priority control buffer, in which phase adjustment cell is used to switch the operational state of the multiplexed delay/priority control buffer in an ATM switch.

2. Description of the Related Art

In a transmission system of ATM (asynchronous transmission mode), instantaneous switching is necessary for preventing lack and redundancy of signal cell, when switching the operational state of a delay/priority control buffer which is multiplexed for the purpose of improving reliability.

The conventional instantaneous switching unit for use in an ATM switch, resets a main signal cell reserving memory of a standby buffer at the execution of switching, using phase adjustment cell, for the purpose of adjusting the phase between a main signal cell reserving memory of an operational buffer section controlling transmission of signal cell, the operational buffer section being in the operating state, and a main signal cell reserving memory of the standby buffer section not controlling transmission of signal cell, the standby buffer section not being in the operating state.

As this kind of the conventional technique, for example, "A redundant switching method of an ATM switch" is disclosed in Japanese Patent Publication Laid-Open (Kokai) No. Heisei 4-86043. The conventional instantaneous switching unit will be, hereinafter, described with the accompanying drawings.

Figure 4:
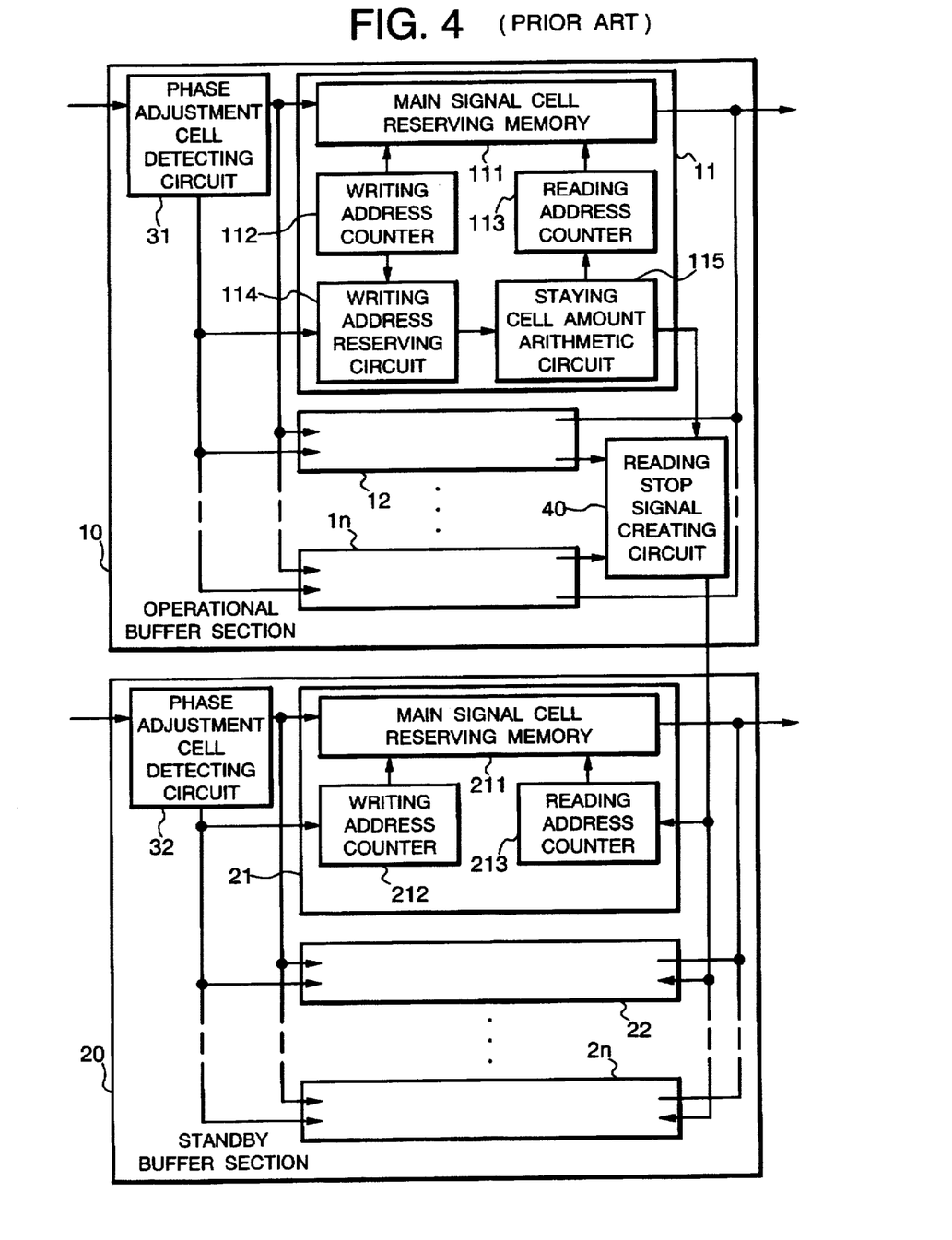
FIG. 4 is a block diagram showing a constitution of a conventional instantaneous switching unit for a delay/priority control buffer.

FIG. 4 is a block diagram showing a constitution of an ATM switch with the conventional instantaneous switching unit for a delay/priority control buffer mounted thereon.

As illustrated in FIG. 4, the ATM switch is provided with an operational buffer section 10 and a standby buffer section 20, each section including a plurality of priority buffers 11 to 1n and 21 to 2n respectively. The respective priority buffers 11 to 1n as well as the priority buffers 21 to 2n have the same structure.

The conventional instantaneous switching unit comprises a phase adjustment cell detecting circuit 31 for detecting phase adjustment cell out of input cell, a main signal cell reserving memory 111 for storing received cell, a writing address counter 112 and a reading address counter 113 for controlling the main signal cell reserving memory 111, a writing address reserving circuit 114 for reserving a writing address, a staying cell amount arithmetic circuit 115 for measuring the amount of main signal cell, which is not subject to the phase adjustment, staying within the main signal cell reserving memory 111, and a reading stop signal creating circuit 40 for transmitting a reading stop signal for controlling readout of the cell in the standby buffer section 20, which are mounted on the operational buffer section 10, and further comprises a phase adjustment cell detecting circuit 32, a main signal cell reserving memory 211, a writing address counter 212 and a reading address counter 213, which are mounted on the standby buffer section 20. Of the above components, the main signal cell reserving memory 111, the writing address counter 112, the reading address counter 113, the writing address reserving circuit 114 and the staying cell amount arithmetic circuit 115 are provided in each priority buffer 11 to 1n. The main signal cell reserving memory 211, the writing address counter 212 and the reading address counter 213 are provided in each priority buffer 21 to 2n.

An operation of instantaneous switching for a delay/priority control buffer in the conventional ATM switch will be described this time.

When the phase adjustment cell for instructing switching of a delay/priority control buffer is respectively entered into the operational buffer 10 and the standby buffer 20, the phase adjustment cell detecting circuits 31 and 32 detect the entered phase adjustment cell, so to perform a switching operation.

In the operational buffer section 10, the phase adjustment cell detecting circuit 31, upon detecting the phase adjustment cell, notifies the writing address reserving circuit 114 of a write trigger signal. The phase adjustment cell is sent from the phase adjustment cell detecting circuit 31 to the priority buffers from the highest priority buffer 11 in sequence, to be written in the main signal cell reserving circuit 111 thereof. The writing address reserving circuit 114 reserves the counter value of the writing address counter 112 at the time of receiving the write trigger signal from the phase adjustment cell detecting circuit 31.

During the switching operation, when the main signal cell having arrived before the issue of the write trigger signal stays in the lower priority buffer of the priority buffers 11 to 1n, readout is performed from the lower priority buffer where the main signal cell has been received before the issue of the write trigger signal, even if the main signal cell having arrived after the issue of the write trigger signal stays in the higher priority buffer of the priority buffers 11 to 1n.

Upon receipt of the write trigger signal, the staying cell amount arithmetic circuit 115 makes a comparison between the counter value of the writing address counter 112 reserved in the writing address reserving circuit 114 and the counter value of the reading address counter 113, and supplies the staying amount information signal about the cell which has been written in the main signal cell reserving memory 111 earlier than the phase adjustment cell until the reading address conforms to the reserved writing address. The reading stop signal creating circuit 40 receives and supervises each staying cell amount information signal supplied from each staying cell amount arithmetic circuit 115 of all the priority buffers 11 to 1n, and supplies the reading stop signal until each comparison value of all the staying cell amount arithmetic circuits 115 becomes "0". The supplied reading stop signal is sent to each reading address counter 213 of the priority buffers 21 to 2n in the standby buffer section 20.

While, in the standby buffer section 20, the phase adjustment cell detecting circuit 32, upon detecting the phase adjustment cell, notifies each writing address counter 212 in all the priority buffers 21 to 2n of the writing counter reset signal. The respective priority buffers 21 to 2n, upon receipt of the writing counter reset signal from the phase adjustment cell detecting circuit 32, reset the respective writing address counters 212 to write the cell arriving later than the phase adjustment cell therein from the address initial value in sequence.

Receiving the reading stop signal supplied from the reading stop signal creating circuit 40 of the operational buffer section 10, the reading address counter 213 of the standby buffer section 20 is reset to return the address to the initial value. The reading address counter 213 stops counting while receiving the reading stop signal. If the entry of the reading stop signal has been finished, it starts readout of the cell reserved in the main signal cell reserving circuit 211, from the address initial value.

However, the conventional instantaneous switching unit for a delay/priority control buffer as mentioned above, resets all the priority buffers of the standby buffer section to supply all the cell staying in the operational buffer section before the phase adjustment cell enters there, by priority. Therefore, if main signal cell, after the input of the phase adjustment cell, enters the higher priority buffer of the operational buffer section than the priority buffer where the cell has already stayed, the accurate priority for the output sequence of the cell cannot be guaranteed in the conventional unit.

SUMMARY OF THE INVENTION

In order to solve the above problem, an object of the present invention is to provide an instantaneous switching unit and switching method for a delay/priority control buffer capable of guaranteeing the accurate priority for the output sequence of the cell at the execution of instantaneous switching.

According to one aspect of the invention, an instantaneous switching unit for a delay/priority control buffer adopted in an ATM switch of a transmission system of asynchronous transmission mode for switching an operational state of the multiplexed delay/priority control buffer, comprises an operational buffer means for executing transmission of signal cell and a standby buffer means for taking over the transmission of the signal cell depending on the necessity; wherein the operational buffer means, upon detecting phase adjustment cell out of received signal cell, recognizes the amount of main signal cell staying there waiting for the timing when it should be read out, the main signal cell having been received earlier than the phase adjustment cell, and notifies the standby buffer means of the staying amount information indicating the presence of the main signal cell staying there as well as the staying amount thereof, and the standby buffer means, upon detecting the phase adjustment cell out of the received signal cell, controls readout of the main signal cell according to the staying amount information received from the operational buffer means.

In the preferred construction, the operational buffer means and the standby buffer means respectively comprises a phase adjustment cell detecting means for detecting phase adjustment cell out of received signal cell, so to supply a write trigger signal, and a plurality of priority buffers provided in the operational buffer means and the standby buffer means, the priority buffers being correspondent to each other in the operational one and the standby one, for performing transmission control of the received signal cell and switching the operational one and the standby one upon receipt of the write trigger signal supplied by the phase adjustment cell detecting means, wherein each of the priority buffers in the operational buffer means, upon receipt of the write trigger signal supplied by the phase adjustment cell detecting means, recognizes the amount of the main signal cell staying there waiting for the timing when it should be read out, the main signal cell having been received earlier than the write trigger signal, and supplies the staying amount information signal indicating the presence of the main signal cell as well as the staying amount thereof to each of the corresponding priority buffers of the standby buffer means, each of the priority buffers in the standby buffer means, upon receipt of the write trigger signal supplied by the phase adjustment cell detecting means, controls the readout of the main signal cell according to the staying amount information signal sent from a staying cell amount arithmetic means of the corresponding priority buffer of the operational buffer means.

In the preferred construction, the operational buffer means and the standby buffer means respectively comprises a phase adjustment cell detecting means for detecting phase adjustment cell out of received signal cell, so to supply a write trigger signal, and a plurality of priority buffers provided in the operational buffer means and the standby buffer means, the priority buffers being correspondent to each other in the operational one and the standby one, for performing transmission control of the received signal cell and switching the operational one and the standby one upon receipt of the write trigger signal supplied by the phase adjustment cell detecting means, each of the priority buffers in the operational buffer means comprises a main signal cell reserving means for storing received signal cell, a writing address assigning means and a reading address assigning means for controlling the main signal cell reserving means, and a writing address reserving means for reserving the writing address stored in the writing address assigning means upon receipt of the write trigger signal supplied by the phase adjustment cell detecting means, wherein the staying cell amount arithmetic means for, upon receipt of the write trigger signal supplied by the phase adjustment cell detecting means, recognizing the amount of the main signal cell staying within the main signal cell reserving means, the main signal cell not being subject to the phase adjustment, and supplying the staying amount information signal indicating the presence of the main signal cell staying there and the staying amount thereof; while each of the priority buffers of the standby buffer means comprises a main signal cell reserving means, a writing address assigning means, a reading address assigning means and a writing address reserving means, similarly to the priority buffer of the operational buffer means, and additionally, and a reading starting address arithmetic means, receiving the write trigger signal and the staying amount information supplied by the staying cell amount arithmetic means of the corresponding priority buffer of the operational buffer means, for controlling the reading operation of the main signal cell which is read out from the main signal cell reserving means of the priority buffer while controlling the reading address assigning means according to the staying amount information signal.

In another preferred construction, the staying cell amount arithmetic means keeps supplying the staying amount information signal to the reading starting address arithmetic means of the corresponding priority buffer in the standby buffer means until address stored in the writing address assigning means and address stored in the reading address assigning means conform to each other, and the reading starting address arithmetic means stops an operation of the reading address assigning means in the priority buffer while receiving the staying amount information signal sent from the staying cell amount arithmetic means of the corresponding priority buffer in the operational buffer means, and controls the reading operation of the main signal cell to be read from the main signal cell reserving means of the priority buffer.

In another preferred construction, the reading starting address arithmetic means creates a reading address by subtracting the value of the staying amount information signal from the address value of the writing address assigning means reserved by the writing address reserving means and stores the created reading address into the reading address assigning means when the value of the staying amount information signal becomes "0".

In another preferred construction, the staying cell amount arithmetic means keeps supplying the staying amount information signal to the reading starting address arithmetic means of the corresponding priority buffer in the standby buffer means until address stored in the writing address assigning means and address stored in the reading address assigning means conform to each other, and the reading starting address arithmetic means stops an operation of the reading address assigning means in the priority buffer while receiving the staying amount information signal sent from the staying cell amount arithmetic means of the corresponding priority buffer in the operational buffer means, controls the reading operation of the main signal cell to be read from the main signal cell reserving means of the priority buffer, creates a reading address by subtracting the value of the staying amount information signal from the address value of the writing address assigning means reserved by the writing address reserving means, and stores the created reading address into the reading address assigning means when the value of the staying amount information signal becomes "0".

According to another aspect of the invention, a switching method according to an instantaneous switching unit for a delay/priority control buffer adopted in an ATM switch of a transmission system of asynchronous transmission mode for switching an operational state of the multiplexed delay/priority control buffer, wherein the instantaneous switching unit comprises an operational buffer means for executing transmission of signal cell and a standby buffer means for taking over the transmission of the signal cell depending on the necessity;

a process of the operational buffer means comprising the steps of:

a first step of detecting phase adjustment cell out of received signal cell;

a second step of, when detecting the phase adjustment cell, reserving information for specifying the signal cell which has been received before the phase adjustment cell is detected; and a third step of recognizing the amount of main signal cell which has been received before the detection of the phase adjustment cell and notifying the standby buffer means of the staying amount information indicating the presence of the main signal cell staying there as well as the staying amount thereof;

a process of the standby buffer means comprising the steps of:

a fourth step of detecting the phase adjustment cell out of the received signal cell;

a fifth step of, when detecting the phase adjustment cell, reserving information for specifying the signal cell which has been received before the phase adjustment cell is detected; and a sixth step of controlling a reading operation of the main signal cell according to the staying amount information received from the operational buffer means.

In this case, the third step of recognizing the amount of the main signal cell and notifying the standby buffer means of the staying amount information includes a seventh step of supplying the staying amount information, and an eighth step of confirming whether the main signal cell which has been received before the phase adjustment cell is detected is all read out or not according to the information for specifying the signal cell reserved in the second step, and returning to the seventh step of supplying the staying amount information if it is not all read out.

Also, the sixth step of controlling the reading operation of the main signal cell includes a ninth step of creating information for specifying reading signal cell, according to the information for specifying the signal cell reserved in the fifth step as well as the staying amount information, and a tenth step of starting reading of the specified signal cell, according to the created information for specifying the reading signal cell, when the value of the staying amount information becomes "0".

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
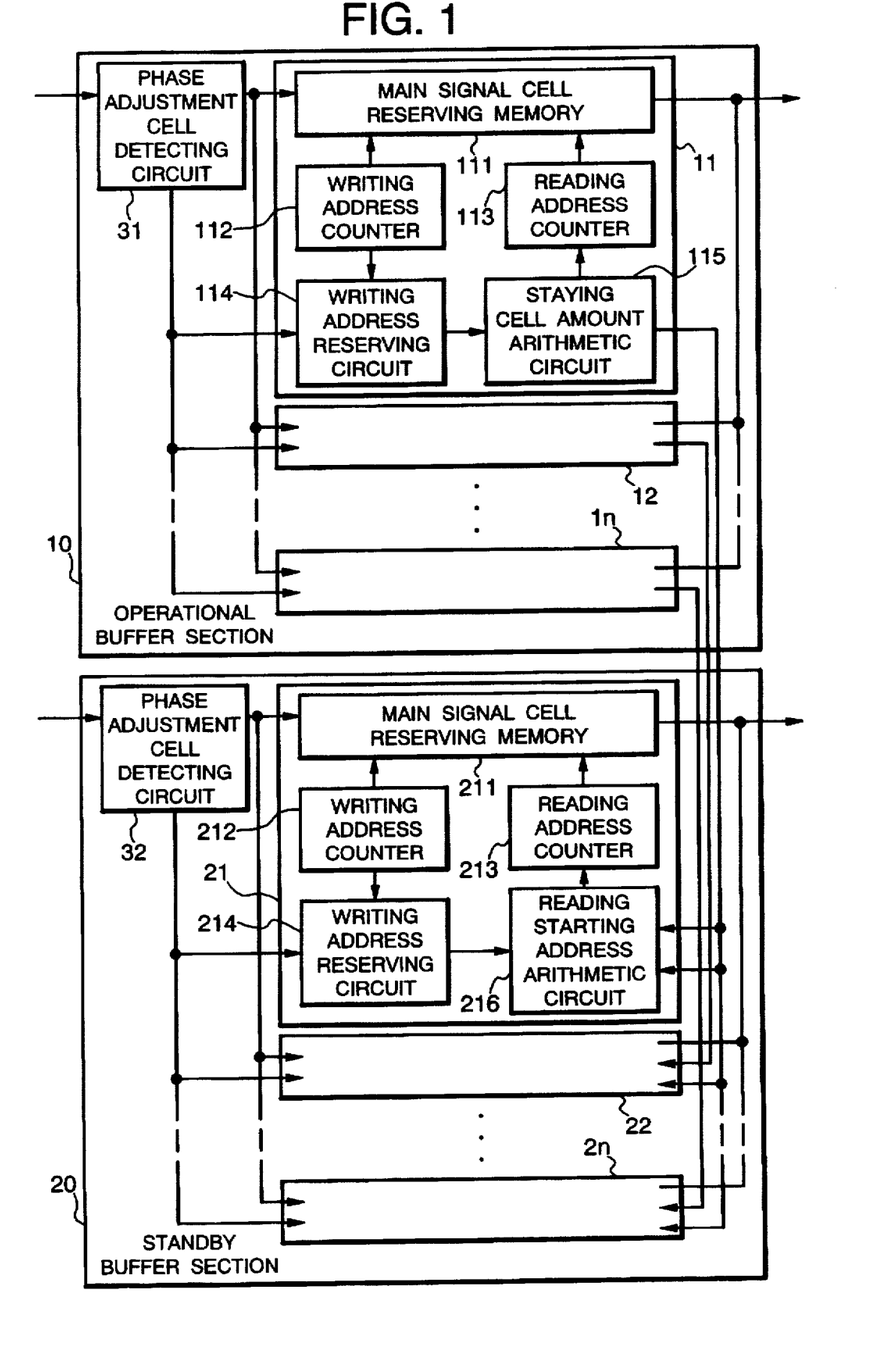
FIG. 1 is a block diagram showing a constitution of an instantaneous switching unit for a delay/priority control buffer according to an embodiment of the present invention.

FIG. 1 is a block diagram showing a constitution of an ATM switch with an instantaneous switching unit for a delay/priority control buffer, according to an embodiment of the present invention, mounted thereon.

As illustrated in FIG. 1, the ATM switch comprises an operational buffer section 10 and a standby buffer section 20, these sections including a plurality of priority buffers 11 to 1n as well as the priority buffers 21 to 2n respectively. Each priority buffer 11 to 1n has the same structure and each priority buffer 21 to 2n has the same one, too.

The instantaneous switching unit of the embodiment consists of each component mounted on the operational buffer section 10 and each component mounted on the standby buffer section 20. The operational buffer section 10 comprises a phase adjustment cell detecting circuit 31 for detecting phase adjustment cell out of input cell, a main signal cell reserving memory 111 for storing received cell, a writing address counter 112 and a reading address counter 113 for controlling the main signal cell reserving memory 111, a writing address reserving circuit 114 for reserving a writing address, and a staying cell amount arithmetic circuit 115 for recognizing the amount of the main signal cell, previous to the phase adjustment, staying within the main signal cell reserving memory 111. The standby buffer section 20 comprises a phase adjustment cell detecting circuit 32, a main signal cell reserving memory 211, a writing address counter 212, a reading address counter 213, a writing address reserving circuit 214, and a reading starting address arithmetic circuit 216 for controlling the reading address counter 213. Of the above components, the main signal cell reserving memory 111, the writing address counter 112, the reading address counter 113, the writing address reserving circuit 114 and the staying cell amount arithmetic circuit 115 are provided in each priority buffer 11 to 1n. While, the main signal cell reserving memory 211, the writing address counter 212, the reading address counter 213 and the writing address reserving circuit 214 are provided in each priority buffer 21 to 2n.

The identical signal cell is usually entered in the operational buffer section 10 and the standby buffer section 20. The operational buffer section and the standby buffer section are identical in structure. Only the difference is that one is running for the output of the signal cell and the other is in the wait state. Of the above components, the phase adjustment cell detecting circuits 31 and 32, the main signal cell reserving memories 111 and 211, the writing address counters 112 and 212, the reading address counters 113 and 213, and the writing address reserving circuits 114 and 214 are respectively identical with each other, in which one of each pair is provided in the operational buffer section 10 and the other is provided in the standby buffer section 20. Therefore, in the following description, each pair of the components will be described together unless there is necessity of distinguishment between the operational one and the standby one.

The main signal cell reserving memory 111 or 211 stores and reserves the received signal cell until it is read out by a reading means of a sending destination device. The writing address counter 112 or 212 stores the address of the writing destination of the signal cell stored in the main signal cell reserving memory 111 or 211. The reading address counter 113 or 213 stores the address having the signal cell to be read out, selecting from the memory addresses of the main signal cell reserving memory 111 or 211. When the counter value of the writing address counter 112 or 212 conforms with the counter value of the reading address counter 113 or 213, the signal cell is read out from the corresponding address of the main signal cell reserving memory 111 or 211, and the signal cell read out is transmitted to a given transmission destination.

The above mentioned components indifferently run in the same way if the received signal cell is that one related to the ordinal data (main signal cell) or it is the phase adjustment cell for switching. However, in the standby buffer section 20 which is not in the operating state, it is needless to say that the signal cell is not read out from the main signal cell reserving memory 211.

The phase adjustment cell detecting circuit 31 or 32 detects phase adjustment cell out of the signal cell received by the ATM switch, in other words, by the operational buffer section 10 and standby buffer section 20. The circuit 31 or 32 sends a write trigger signal to each writing address reserving circuit 114 or 214 of the priority buffers 11 to 1n or 21 to 2n. The detected phase adjustment cell is sent to the priority buffers from the highest priority buffer 11 or 21 in sequence to be written in the main signal cell reserving memories 111 or 211 thereof.

Upon receipt of the write trigger signal, the writing address reserving circuit 114 or 214 reserves the counter value specified by the writing address counter 112 or 212 at the time of receiving the write trigger signal. The writing address reserving circuit 114 of the priority buffer 11 in the operational buffer section 10 sends the reserved counter value and the received write trigger signal to the staying cell amount arithmetic circuit 115. While, the writing address reserving circuit 214 of the priority buffer 21 in the standby buffer section 20 sends the reserved counter value to the reading starting address arithmetic circuit 216.

Upon receipt of the write trigger signal, the staying cell amount arithmetic circuit 115 of the priority buffer 11 in the operational buffer section 10 makes a comparison between the counter value of the writing address counter 112 reserved in the writing address reserving circuit 114 and the counter value of the reading address counter 113. Until both the counter values conform with each other, the circuit 115 supplies the information signal about the staying amount individually to the corresponding priority buffer (21-2n) in the standby buffer section according to the priority buffer (11-1n) in the operational buffer section. The staying amount information signal means the signal which has been entered earlier than the phase adjustment cell, indicating that there stays the main signal cell written in the main signal cell reserving memory 111 in one of the priority buffers 12 to 1n, and the value of the staying amount information signal is obtained by the difference between the value of the reading address counter 113 and the value of the writing address counter 112.

The reading starting address arithmetic circuit 216 in the standby buffer section 20 stops the operation of the reading address counter 213, until the staying cell amount information signal becomes "0", which is sent from the staying cell amount arithmetic circuit 115 of the priority buffer (11n) corresponding to the priority buffer (21-2n). Further, the circuit 216 creates a reading address by subtracting the value of the staying cell amount information signal from the address value (the counter value reserved) received from the writing address reserving circuit 214.

Figure 2:
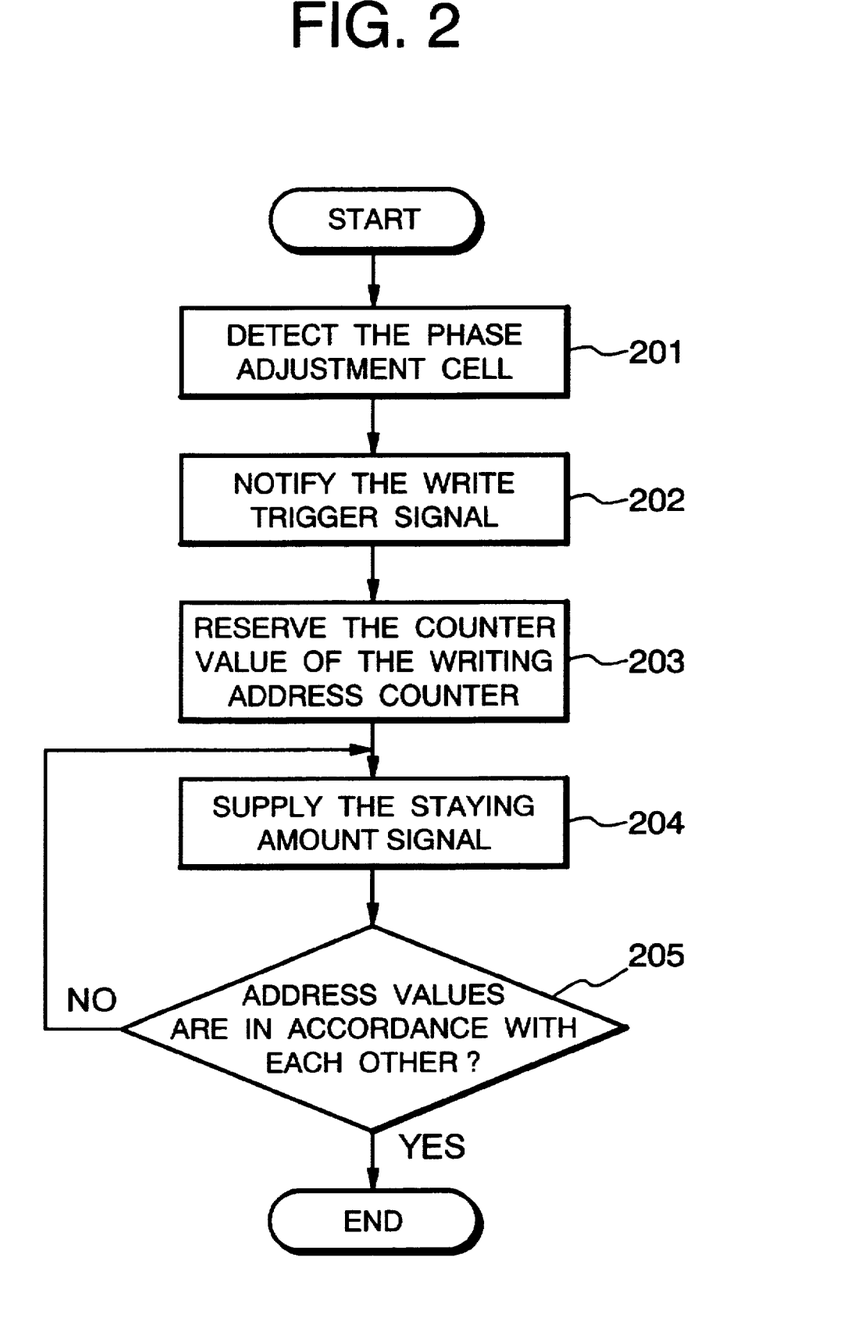
FIG. 2 is a flow chart showing a movement of an operational buffer section at the time of instantaneous switching according to the embodiment.
Figure 3:
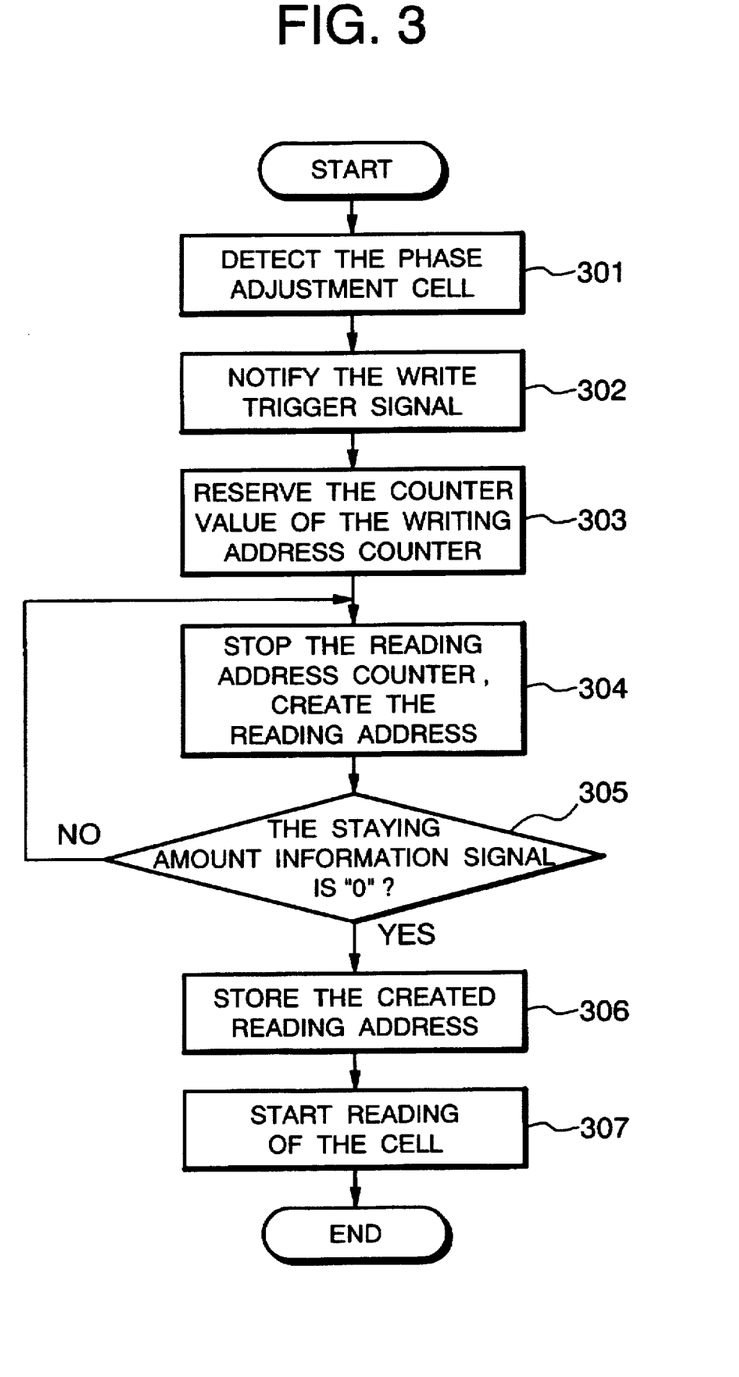
FIG. 3 is a flow chart showing a movement of a standby buffer section at the time of instantaneous switching according to the embodiment.

Hereinafter, a movement of the instantaneous switching unit for a delay/priority control buffer according to the embodiment having the above mentioned structure, will be described with reference to the flow charts of FIGS. 2 and 3. FIG. 2 shows a movement of the operational buffer section 10, and FIG. 3 shows a movement of the standby buffer section.

In the operational buffer section 10, upon detecting the phase adjustment cell (Step 201), the phase adjustment cell detecting circuit 31 notifies the respective writing address reserving circuits 114 in all the priority buffers 11 to 1n of the write trigger signal (Step 202). The phase adjustment cell is sent from the phase adjustment cell detecting circuit 31 to the priority buffers from the highest priority buffer 11 in sequence, to be written in the main signal cell reserving memories 111 thereof.

The respective writing address reserving circuits 114 of all the priority buffers 11 to 1n reserve each counter value specified by the respective writing address counters 112 at the time of receiving the write trigger signal from the phase adjustment cell detecting circuit 31 (Step 203). The respective circuits 114 send the write trigger signal to the respective staying cell amount arithmetic circuits 115.

Upon receipt of the write trigger signal, the respective staying cell amount arithmetic circuits 115 make a comparison between each counter value of the writing address counters 112 reserved in the writing address reserving circuits 114 and each counter value of the reading address counters 113. The circuits 115 respectively supply the staying amount information signal of the cell which has been written in each main signal cell reserving memory earlier than the phase adjustment cell, to the corresponding priority buffers of the priority buffers 21 to 2n in the standby buffer section individually (Steps 204 and 205).

While, in the standby buffer section 20, upon detecting the phase adjustment cell (Step 301), the phase adjustment cell detecting circuit 32 notifies the respective writing address reserving circuits 214 in all the priority buffers 21 to 2n of the write trigger signal (Step 302). The phase adjustment cell is sent from the phase adjustment cell detecting circuit 32 to the priority buffers from the highest priority buffer 21 in sequence, to be written in the main signal cell reserving memories 211 thereof. The respective writing address reserving circuits 214 of all the priority buffers 21 to 2n reserve the counter values specified by the respective writing address counters 212 at the time of receiving the write trigger signal from the phase adjustment cell detecting circuit 32 (Step 303).

The reading starting address arithmetic circuits 216 respectively stop the operation of the reading address counters 213 until each staying cell amount information signal sent from the staying cell amount arithmetic circuits 115 of the corresponding priority buffers 11 to 1n in the operational section in accordance with the priority buffers 21 to 2n in the standby section, becomes "0". The circuits 216 respectively create the reading address by subtracting each value of the staying cell amount information signal from each address value received from the writing address reserving circuits 214 (Steps 304 and 305).

When each staying amount information signal sent from the staying cell amount arithmetic circuits 115 becomes "0", the respective reading starting address arithmetic circuits 216 store into the respective reading address counters 213 the reading address value obtained by the operation (Step 306). Thus, readout of the cell from the main signal cell reserving memory 211 is started from the priority buffer (21-2n) where the value of the writing address counter 212 and the value of the reading address counter 213 conform with each other (Step 307).

As mentioned above, phase adjustment cell is used in order to adjust the phase with respect to the highest priority buffer and the signal cell staying in the priority buffer which has entered there earlier than the phase adjustment cell, is notified to the standby buffer section 20. Owing to this, the standby buffer section 20 can supply the corresponding staying signal cell with the guarantee of the priority about the output sequence.

Although the present invention has been described with the preferred embodiment, the invention is not limited to this embodiment.

As set forth hereinabove, according to the present invention, phase adjustment cell is used in order to adjust the phase with respect to the highest priority buffer and the signal cell staying in the priority buffer which has entered there earlier than the phase adjustment cell, is notified to the standby buffer section 20. Therefore, the standby buffer section can provide the staying signal cell with the guarantee of the priority about the output sequence advantageously.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An instantaneous switching unit for a delay/priority control buffer adopted in an ATM switch of a transmission system of asynchronous transmission mode for switching an operational state of the multiplexed delay/priority control buffer, comprising:

an operational buffer means for executing transmission of signal cell and a standby buffer means for taking over the transmission of the signal cell depending on the necessity; wherein said operational buffer means, upon detecting phase adjustment cell out of received signal cell, recognizes the amount of main signal cell staying there waiting for the timing when it should be read out, the main signal cell having been received earlier than the phase adjustment cell, and notifies said standby buffer means of the staying amount information indicating the presence of the main signal cell staying there as well as the staying amount thereof, and said standby buffer means, upon detecting the phase adjustment cell out of the received signal cell, controls readout of the main signal cell according to the staying amount information received from said operational buffer means.

2. An instantaneous switching unit for a delay/priority control buffer as set forth in claim 1, wherein said operational buffer means and said standby buffer means respectively comprising a phase adjustment cell detecting means for detecting phase adjustment cell out of received signal cell, so to supply a write trigger signal, and a plurality of priority buffers provided in said operational buffer means and said standby buffer means, said priority buffers being correspondent to each other in said operational one and said standby one, for performing transmission control of the received signal cell and switching said operational one and said standby one upon receipt of the write trigger signal supplied by said phase adjustment cell detecting means, wherein each of said priority buffers in said operational buffer means, upon receipt of the write trigger signal supplied by said phase adjustment cell detecting means, recognizes the amount of the main signal cell staying there waiting for the timing when it should be read out, the main signal cell having been received earlier than the write trigger signal, and supplies the staying amount information signal indicating the presence of the main signal cell as well as the staying amount thereof to each of said corresponding priority buffers of said standby buffer means, each of said priority buffers in said standby buffer means, upon receipt of the write trigger signal supplied by said phase adjustment cell detecting means, controls the readout of the main signal cell according to the staying amount information signal sent from a staying cell amount arithmetic means of said corresponding priority buffer of said operational buffer means.

3. An instantaneous switching unit for a delay/priority control buffer as set forth in claim 1, wherein, said operational buffer means and said standby buffer means respectively comprising a phase adjustment cell detecting means for detecting phase adjustment cell out of received signal cell, so to supply a write trigger signal, and a plurality of priority buffers provided in said operational buffer means and said standby buffer means, said priority buffers being correspondent to each other in said operational one and said standby one, for performing transmission control of the received signal cell and switching said operational one and said standby one upon receipt of the write trigger signal supplied by said phase adjustment cell detecting means, each of said priority buffers in said operational buffer means comprising a main signal cell reserving means for storing received signal cell, a writing address assigning means and a reading address assigning means for controlling said main signal cell reserving means, and a writing address reserving means for reserving the writing address stored in said writing address assigning means upon receipt of the write trigger signal supplied by said phase adjustment cell detecting means, wherein said staying cell amount arithmetic means for, upon receipt of the write trigger signal supplied by said phase adjustment cell detecting means, recognizing the amount of the main signal cell staying within said main signal cell reserving means, the main signal cell not being subject to the phase adjustment, and supplying the staying amount information signal indicating the presence of the main signal cell staying there and the staying amount thereof; while each of said priority buffers of said standby buffer means comprising a main signal cell reserving means, a writing address assigning means, a reading address assigning means and a writing address reserving means, similarly to said priority buffer of said operational buffer means, and additionally, and a reading starting address arithmetic means, receiving the write trigger signal and the staying amount information supplied by said staying cell amount arithmetic means of said corresponding priority buffer of said operational buffer means, for controlling the reading operation of the main signal cell which is read out from said main signal cell reserving means of said priority buffer while controlling said reading address assigning means according to the staying amount information signal.

4. An instantaneous switching unit as set forth in claim 3, wherein said staying cell amount arithmetic means keeps supplying the staying amount information signal to said reading starting address arithmetic means of said corresponding priority buffer in said standby buffer means until address stored in said writing address assigning means and address stored in said reading address assigning means conform to each other, and said reading starting address arithmetic means stops an operation of said reading address assigning means in said priority buffer while receiving the staying amount information signal sent from said staying cell amount arithmetic means of said corresponding priority buffer in said operational buffer means, and controls the reading operation of the main signal cell to be read from said main signal cell reserving means of said priority buffer.

5. An instantaneous switching unit for a delay/priority control buffer as set forth in claim 3, wherein said reading starting address arithmetic means creates a reading address by subtracting the value of the staying amount information signal from the address value of said writing address assigning means reserved by said writing address reserving means and stores the created reading address into said reading address assigning means when the value of the staying amount information signal becomes "0".

6. An instantaneous switching unit as set forth in claim 3, wherein said staying cell amount arithmetic means keeps supplying the staying amount information signal to said reading starting address arithmetic means of said corresponding priority buffer in said standby buffer means until address stored in said writing address assigning means and address stored in said reading address assigning means conform to each other, and said reading starting address arithmetic means stops an operation of said reading address assigning means in said priority buffer while receiving the staying amount information signal sent from said staying cell amount arithmetic means of said corresponding priority buffer in said operational buffer means, controls the reading operation of the main signal cell to be read from said main signal cell reserving means of said priority buffer, creates a reading address by subtracting the value of the staying amount information signal from the address value of said writing address assigning means reserved by said writing address reserving means, and stores the created reading address into said reading address assigning means when the value of the staying amount information signal becomes "0".

7. A switching method according to an instantaneous switching unit for a delay/priority control buffer adopted in an ATM switch of a transmission system of asynchronous transmission mode for switching an operational state of the multiplexed delay/priority control buffer, wherein said instantaneous switching unit comprises an operational buffer means for executing transmission of signal cell and a standby buffer means for taking over the transmission of the signal cell depending on the necessity;

a process of said operational buffer means comprising the steps of:

a first step of detecting phase adjustment cell out of received signal cell;

a second step of, when detecting the phase adjustment cell, reserving information for specifying the signal cell which has been received before the phase adjustment cell is detected; and a third step of recognizing the amount of main signal cell which has been received before the detection of the phase adjustment cell and notifying said standby buffer means of the staying amount information indicating the presence of the main signal cell staying there as well as the staying amount thereof;

a process of said standby buffer means comprising the steps of:

a fourth step of detecting the phase adjustment cell out of the received signal cell;

a fifth step of, when detecting the phase adjustment cell, reserving information for specifying the signal cell which has been received before the phase adjustment cell is detected; and a sixth step of controlling a reading operation of the main signal cell according to the staying amount information received from said operational buffer means.

8. A switching method according to the instantaneous switching unit for a delay/priority control buffer as set forth in claim 7, wherein said third step of recognizing the amount of the main signal cell and notifying said standby buffer means of the staying amount information including a seventh step of supplying the staying amount information, and an eighth step of confirming whether the main signal cell which has been received before the phase adjustment cell is detected is all read out or not according to the information for specifying the signal cell reserved in said second step, and returning to said seventh step of supplying the staying amount information if it is not all read out.

9. A switching method according to the instantaneous switching unit for a delay/priority control buffer as set forth in claim 7, wherein said sixth step of controlling the reading operation of the main signal cell including a ninth step of creating information for specifying reading signal cell, according to the information for specifying the signal cell reserved in said fifth step as well as the staying amount information, and a tenth step of starting reading of the specified signal cell, according to the created information for specifying the reading signal cell, when the value of the staying amount information becomes "0".

* * * * *